(No Model.)
G. L. ELDER.
CHART FOR EDUCATIONAL PURPOSES.
No. 395,554. Patented Jan. 1, 1889.
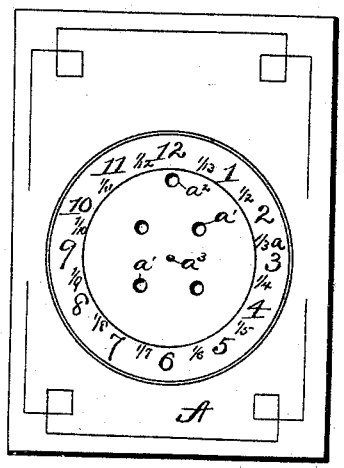
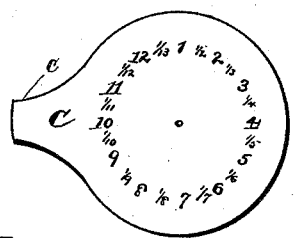
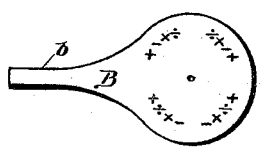
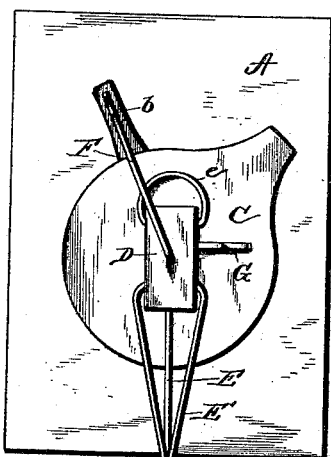
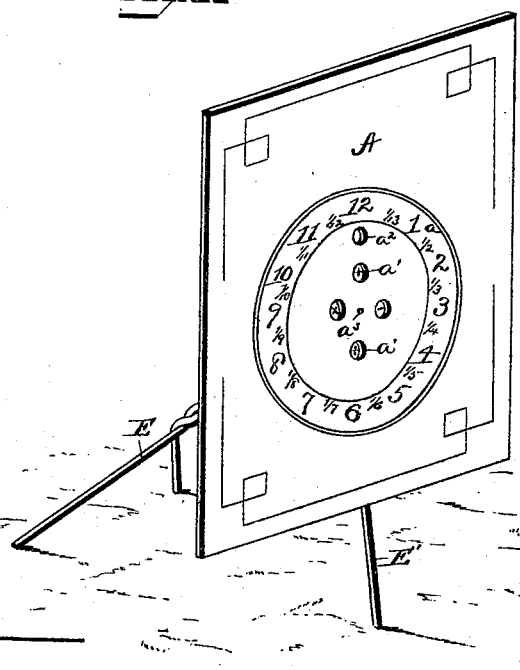
WITNESSES.
INVENTOR.

UNITED STATES PATENT OFFICE.

GEORGE LINCOLN ELDER, OF WILMINGTON, INDIANA.

CHART FOR EDUCATIONAL PURPOSES.

SPECIFICATION forming part of Letters Patent No. 395,554, dated January 1, 1889.

Application filed August 18, 1888. Serial No. 283,118. (No model.)

*To all whom it may concern:*

Be it known that I, GEORGE LINCOLN ELDER, a citizen of the United States, and a resident of Wilmington, in the county of Dearborn and State of Indiana, have invented certain new and useful Improvements in Charts for Educational Purposes; and I do hereby declare that the following is a full, clear, and exact description of the invention, which will enable others skilled in the art to which it appertains to make and use the same.

This invention relates to educational appliances.

The object is to produce an arithmetical chart by means of which a knowledge of the fundamental principles of arithmetic may be imparted to young children by means of mental calculation, thereby enabling those in the lower grades of schools to obtain a much clearer and better idea of working arithmetical problems mentally than by the ordinary means employed for the purpose—that is, by carrying a certain number of figures through the four divisions of arithmetic, namely, addition, subtraction, multiplication, and division—without having to resort to the use of any ocular demonstration, as by a blackboard exercise. Furthermore, the object is to produce a device which shall be simple of construction, efficient and durable in use, and comparatively inexpensive of production.

Heretofore all instruments of calculation designed for use in schools have been objectionable in that they have been so intricate that in order to carry a child's mind through the various operations necessary to produce the desired result the number of operations have been so numerous that the child would become confused and unable to understand or state clearly the desired result.

It is the object of the present invention to overcome these obstacles in a simple and effective manner; and to these ends the invention consists in a chart provided with any number of numbers and fractional parts of the same, in combination with rotating disks provided with the arithmetical signs and numbers and parts of the same.

The invention further consists in the various novel details of construction, whereby the objects for which this device is designed are attained, all of which will be hereinafter fully discussed in the specification, illustrated in the drawings, and pointed out in the claims.

In the accompanying drawings, forming part of this specification, and in which like letters of reference indicate corresponding parts, I have illustrated one form of device embodying my invention, although the same may be carried into effect in other ways without in the least departing from the spirit thereof, and in these drawings—

Figure 1 is an elevation of the outer disk or chart. Fig. 2 is an elevation of the disk carrying the arithmetical signs. Fig. 3 is an elevation of another disk provided with numbers and fractional parts of the same. Fig. 4 is a rear elevation showing the manner in which the disks are held in place upon the chart, and Fig. 5 is a perspective view with the device intact.

Referring to the drawings, A designates the outer portion or chart, the center of which is provided with the dial $a$, divided into any number of given parts, but preferably in this instance into twelve, as being the number of parts into which the multiplication table is usually divided. Between each of the said numbers are placed fractions running from one-half to one-thirteenth.

The edge of this chart may be ornamented in any desired manner that will present an attractive and neat appearance, so that the device will prove an ornament to any school-room.

In the center portion of the dial are formed four openings, $a'$, and above these and directly under the figure 12 is formed another opening, $a^2$.

B designates the disk on which the arithmetical signs are placed, the order in which they are arranged alternating—that is, in one instance the plus sign will be first in the series, and in the next the minus first, so that when the disk is turned to bring these signs opposite the openings $a'$ in the chart A there will be a different sign at each opening, which would not be the case were the signs arranged regularly, thereby presenting at one and the same time to the view of the pupil through the openings $a'$ all of the arithmetical signs used in the elementary principles of arithmetic.

C designates another disk provided with the same number of figures as the chart, these figures being so arranged that when the disk is rotated the figures or fractions will appear through the opening $a^2$ in the chart.

In order to hold the device intact, so as to readily operate the same, a pivot, $a^3$, is inserted through the center of the chart through each of the disks, and to this pivot, at the rear portion of the device, is attached a block, D, to which are movably secured two legs, E and E', the hind leg, E, being twisted together and then spread out, as shown, so as to give a steady support for the chart, and the front leg, E', being made of a single stationary piece inserted into the lower end of the block.

$e$ designates a ring, which is also secured to the block, so as to enable the device to be hung up after being used.

F designates a spring movably secured at one end to the block D and the opposite end to an arm, $b$, on the disk B, the said spring being designed to cause the dial to remain stationary when the other dial, C, is turned, this last-named dial being also held in place by means of a spring, G, which is rigidly secured to the block and bears upon the outer surface of the said dial, the distance between the block and the point where the spring is connected with the projection $b$ being sufficient to admit of the arm $c$ passing between the same.

In order to understand the operation of this device it will be necessary to give an example. In carrying this into effect the chart is placed before the class, and they are given to understand that whatever number appears at the opening $a^2$ is the one with which the calculation is to begin. For example, the disk C will be turned until the number 7 appears at the opening $a^2$. The teacher will then point to the sign of multiplication and then to 5, indicating that the number seven is to be multiplied by the number five, giving a result of thirty-five. He then points to plus and then to 8, thus making a total of forty-three, and then to the minus sign and then to 10, indicating that the ten is to be deducted from the forty-three, thus giving as the result of the calculation thirty-three. If desired, the calculation may be carried through all of the signs and through the whole number of fractions, it being only necessary to change the dials to present a new series of numbers and arithmetical signs.

It will thus be seen that although this device is exceedingly simple of construction it will be found highly efficient and durable in use and may be constructed at comparatively a slight expense.

Having thus fully described my invention, what I claim as new, and desire to secure by Letters Patent, is—

1. In a device for educational purposes, the combination of a chart having a fixed figured dial and a number of openings, a pivot extending through the said chart, movable figured disks mounted upon the said pivot, and a block for keeping the disks in position against the chart, substantially as described.

2. In a device for educational purposes, the combination of a chart having a fixed figured dial and a number of openings, a pivot extending through the said chart, movable figured disks mounted upon the said pivot, a block for keeping the disks in position against the chart, and springs secured to the block for holding the disks at the desired point, substantially as described.

3. In a device for educational purposes, the combination of a chart having a fixed figured dial and a number of openings, a pivot extending through the said chart, movable figured disks mounted upon the said pivot, a block for keeping the disks in position against the chart, springs secured to the block for holding the disks at the desired point, and legs secured to the block to support the device, substantially as described.

In testimony that I claim the foregoing as my own I have hereunto affixed my signature in presence of two witnesses.

GEORGE LINCOLN ELDER.

Witnesses:
 LAFE CHECK,
 HENRY PERPINGON.